United States Patent [19]

Douglas et al.

[11] 4,278,306
[45] Jul. 14, 1981

[54] LOAD SUPPORTING ROLLER ASSEMBLIES

[75] Inventors: Jack E. Douglas, Walsall; Richard J. Bigley, Telford, both of England

[73] Assignee: Arthur Shaw Manufacturing Limited, West Midlands, England

[21] Appl. No.: 112,743

[22] Filed: Jan. 17, 1980

[30] Foreign Application Priority Data

Jan. 24, 1979 [GB] United Kingdom ............... 02556/79

[51] Int. Cl.³ ............................................. F16C 29/06
[52] U.S. Cl. ............................... 308/6 C; 308/DIG. 8
[58] Field of Search .................. 308/6 R, 6 C, DIG. 8

[56] References Cited

U.S. PATENT DOCUMENTS

| | | | |
|---|---|---|---|
| 1,881,675 | 10/1932 | Klausmeyer et al. | 308/6 C |
| 2,744,758 | 5/1956 | Stokvis et al. | 308/6 C |
| 3,389,625 | 6/1968 | Wagner | 308/6 C |
| 3,920,289 | 11/1975 | Demay | 308/6 C |
| 3,977,736 | 8/1976 | Pitner | 308/6 C |

FOREIGN PATENT DOCUMENTS 2911721 11/1979 Fed. Rep. of Germany ......... 308/6 C

*Primary Examiner*—Richard R. Stearns
*Attorney, Agent, or Firm*—Wender, Murase & White

[57] ABSTRACT

A roller assembly for supporting sliding doors on a track or rail comprises a plurality of short rollers (10) which are confined to run around an oval track (9a) formed in a two part housing (7). Some of the rollers (10) are engageable with the track through an elongate slot (13) in the base of the housing (7) so that load is distributed over several rollers. The housing (7) is mounted for adjustment in a carrier (5) which can be mounted on a door. The adjustment permits variations in height or levels to be accommodated.

2 Claims, 4 Drawing Figures

LOAD SUPPORTING ROLLER ASSEMBLIES

BACKGROUND OF THE INVENTION

1. Field of the Invention:

This invention concerns improvements in or relating to load supporting roller assemblies of the kind that are used for engagement with a track or rail to permit movement of a heavy element carrying the roller relative to the track. In particular, but not exclusively, this invention has application for supporting a door or window for sliding movement along a rail.

2. Description of Prior Art:

It is already known to provide roller assemblies that are like wheels having some form of axle for mounting the wheel for rotation. It is also known to provide wheels having specially shaped rims, or even tyres for location on a rail or track. It is also known to provide roller assemblies made of various materials to resist wear and to reduce friction. However, the known type of roller assembly usually suffers from one distinct disadvantage when used for supporting a heavy element, and this is that there is only a very small area of contact with the rail or track through which the load and pressure is exerted. This load and pressure means that wear and distortion occurs both in the roller and the track, and even the provision of a tyre or special track or rail cannot obviate this in many cases without making the eventual assembly too cumbersome, or too expensive, or even so complex that repair or replacement is impractical.

Summary of the Invention

It is an object of this invention to provide a roller assembly of an improved construction to avoid the foregoing disadvantages.

According to this invention we provide a roller assembly adapted for mounting on an element for movement on a track or rail, the roller assembly comprising a housing defining a continuous path in which a plurality of short rollers are located for rolling movement along and around said path, the housing having an elongate slot or groove opening to a substantially linear portion of said path whereby a plurality of the rolling contact faces of the short rollers are presented for engagement with the track or rail.

As will be understood, the provision of a plurality of rolling contact faces in the roller assembly according to this invention permits the load/pressure to be distributed through a larger contact or bearing area than with a single wheel or roller.

Preferably, the roller housing defines a path which is oval and along which the short rollers move in use. The short rollers are conveniently in the form of cylindrical bodies with each of their opposed ends located in the housing so that the central portion of each short rollers provides the rolling contact face exposed through the slot or groove in the housing.

Conveniently, the housing is formed in two similar opposite-handed parts, each with an oval-shaped groove so that when the two parts are assembled together, the grooves define said path. The number and size of short rollers may be varied and may depend on criteria of load, bearing contact and the rail or track.

In a rail or track of the upstanding type, for example with a rib or bead for engagement with the rolling contact faces, the opposed sides of the slot or groove in the housing of the invented roller assembly may provide abutment or guide faces to locate the roller assembly on the rail or track.

Preferably, the housing and the short rollers may be made of a low friction material, for example an acetal resin. The type of material or resin may be chosen in accordance with the physical properties required, but other materials may be used as compatible with the material used for the truck or rail. Acetal resins are particularly suitable for use with aluminium alloys as commonly used in tracks or rails for sliding doors or windows.

Another problem arising with roller assemblies used for sliding doors or windows is providing for adjustment to accommodate differences in the height of the aperture or rail spacing and to adjust the door or window during fitting or service. The housing of the invented roller assembly is specially mounted in a carrier which is adapted to allow both fitting of the roller assembly, and to allow adjustment of the housing relative to the carrier.

In a preferred arrangement, the carrier includes at least one face engaged by the housing and inclined relative to the linear portion of said path of the short rollers, the housing being mounted for adjusting movement on said inclined face to vary the distance between the extent of said linear portion so as to enable the member carried by the invented roller assembly to be raised or lowered relative to the track or rail.

Such adjustment may be achieved by a simple screw or stud arranged to urge or move the housing relative to the carrier along said inclined face. Preferably, there are two such inclined faces which locate the housing on the carrier. An abutment or stop may be provided to restrict movement of the housing.

Further features of this invention will be explained with reference to an exemplary embodiment shown in the accompanying drawings which depict a roller assembly according to this invention as applied to an element comprising a patio door.

Figure 1:
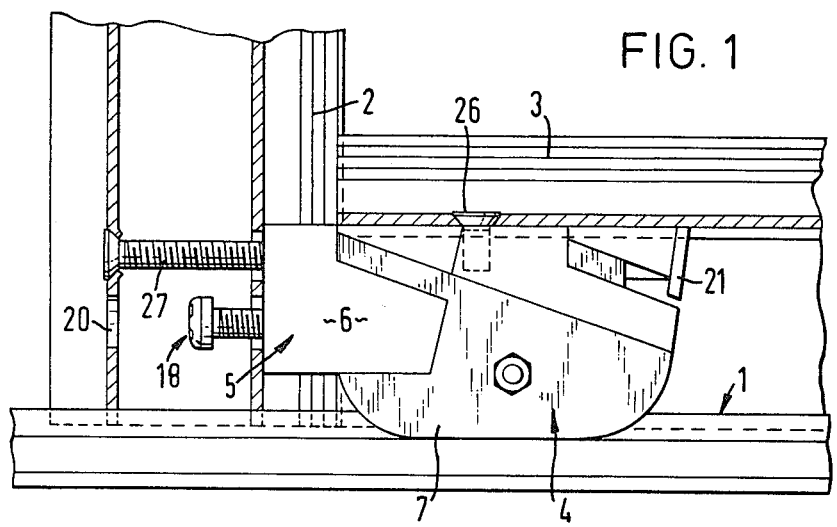
FIG. 1 depicts one corner of a patio door (partly sectioned) mounted by a roller assembly for sliding movement on a track.
Figure 2:
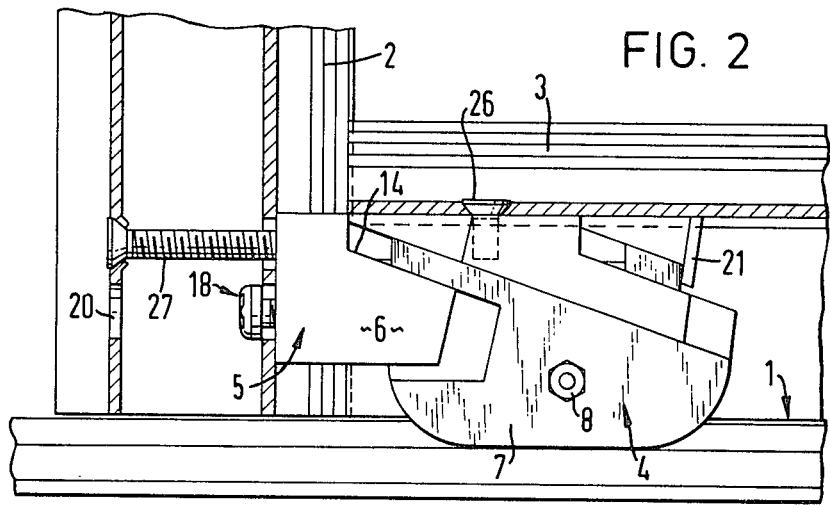
FIG. 2 is a view similar to that of FIG. 1, but depicting the roller assembly in an adjusted position to raise or lift the patio door relative to the track.

With reference to this embodiment of the invention, the drawings of FIGS. 1 and 2 depict a conventional upstanding track or rail 1 set down for carrying a patio door having a metal frame comprising a stile 2 and a lower cross member 3. The frame would be glazed, wholly or partly, in known manner, and the lower cross-member 3 would include a section of inverted channel shape inside which the roller assembly 4 would be concealed. Furthermore, the stile 2 would be of hollow section. Usually, the metal frame comprises extruded aluminium sections.

The roller assembly 4 comprises a carrier 5 adapted by means of countersunk threaded bores 25 for fixing to the frame members of the door by fixing screws 26 and 27. Any suitable fixings may be provided depending on the design and construction of the door.

The carrier 5 is generally of rectangular shape in top plan view but has two opposed similar side portions 6 which are spaced apart and define a channel shaped recess therebetween in which a housing 7 is received. The carrier 5 is preferably metal, and may comprise a casting, such as a die-casting, or it may be a fabrication.

Figure 3:
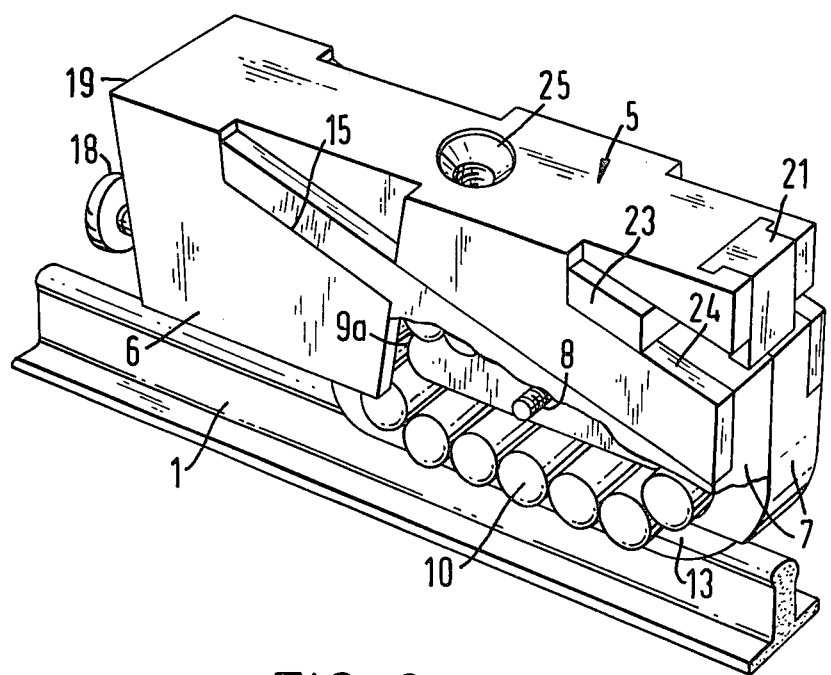
FIG. 3 is a partly sectioned detail view of the roller assembly.
Figure 4:
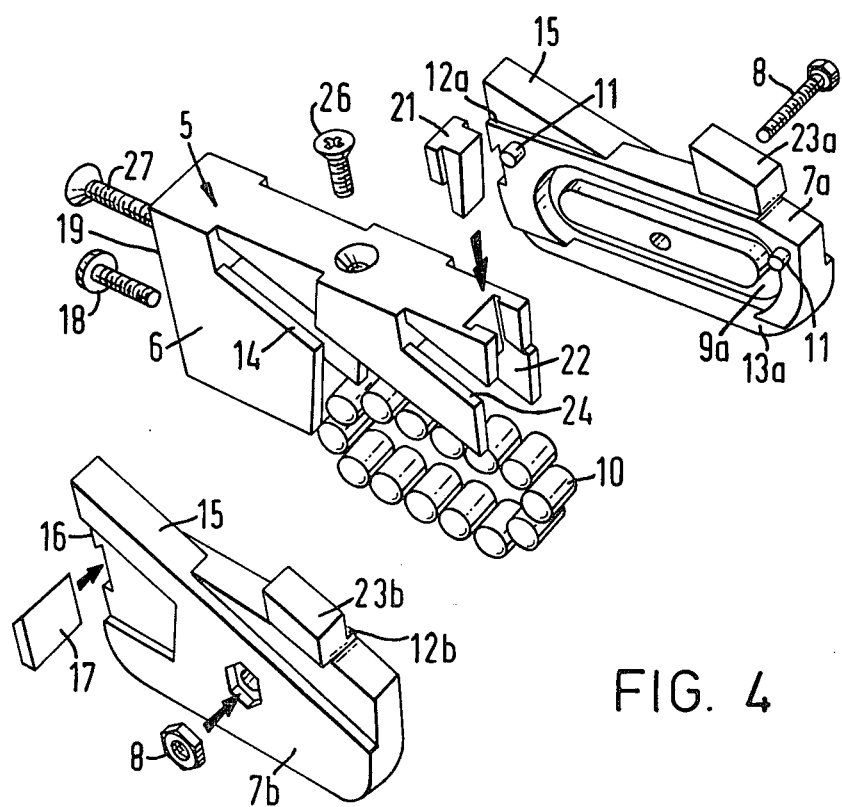
FIG. 4 is an exploded isometric view of the roller assembly.

The housing 7 is formed of two similar opposite-handed parts, 7a and 7b which are held together by a central bolt and nut 8. Each housing part 7a,7b, includes an oval shaped groove 9a, the section of the groove being channel-shaped to receive the ends of a plurality of short cylindrical rollers 10. As will be appreciated, especially as shown in FIGS. 3 and 4, the grooves 9a define a path in which the rollers 10 are confined when the housing parts 7a,7b are connected together.

The rollers 10 are arranged with sufficient clearance to permit their rolling movement around the path. The housing parts 7a and 7b and the rollers 10 may be of a low friction plastics material such as acetal resin.

For convenience in assembly, and for locating the housing parts 7a,7b together, lugs 11 may be provided on one housing part to be received in complementary holes in the other housing part, or separate pins may be provided. Additionally, the inside face of the carrier if formed with a short longitudinal rib (not shown) which seats in a longitudinal slot formed in the assembled housing 7 by the rebates 12a,12b, extending on the mating faces of the housing parts 7a and 7b.

The housing parts 7a,7b also have rebates 13a extending along their respective lower edges which open to the respective grooves 9a. In the assembled housing, these rebates 13a form an elongate slot 13 through which a plurality of the rollers 10 are presented for rolling engagement with the head of the rail 1. The extent of these rollers 10 presented for rolling engagement is substantially linear and each roller 10 provides a bearing face through which loads may be transmitted. This achieves a spreading of the total load along a length of the rail 1 and high point loading is avoided.

Additionally, the opposed side faces of the slot 13 serve to extend on respective sides of the head of the rail, and this assists in locating and guiding the roller assembly carrying the door along the length of the rail during sliding movement.

According to a further feature of this roller assembly, the housing 7 carrying the short rollers 10 may be adjusted relative to the carrier 5 to raise or lower a sliding door relative to the rail 1. This adjustment may be required during fitting, removal, or on settlement or wear of parts.

For this adjustment, each side portion 6 of the carrier 5 is provided with an inclined face 14 against which a similar respective inclined face 15 on each side of the housing is slidably engaged and located. The end face 16 of the housing assembly is provided with small thrust plate 17 located in an undercut. This plate 17 is arranged to be engaged by an adjuster screw 18 in threaded engagement with the end wall 19 of the carrier. On rotation of the head of the adjuster screw 18 through a clearance opening provided in the frame stile 2, the housing 7 can be moved along the inclined face so as to vary the position of the housing with respect to the carrier 5. Two extremes of adjustment are shown in FIGS. 1 and 2.

To hold the roller assembly together, and to limit the adjustment, a stop plate 21 is mounted in an undercut rebate 22 formed in the end face of the carrier 5 opposed to the thrust plate 17. The stop plate 21 is arranged to provide an abutment for engagement by two lugs 23a,23b formed respectively on the housing parts 7a,7b. These lugs 23a,23b are each arranged so as to extend parallel to the inclined face 14 to assist in guiding and location, and to complement supplementary inclined slots with guide faces 24 provided in the side portions 6 of the carrier.

It will be understood that the range of adjustment can be varied by changing the dimensions of the carrier and the housing, and a wide range of load bearing capacities can also be accommodated by changing the length of the roller path, type of material used and other characteristics.

Tests have been carried out on a roller assembly in accordance with the foregoing embodiment in which the housing and roller were of acetal resin. The rollers were made from polyacetal rod and of about 8 mm diameter. A pair of roller assemblies were mounted on a door having a weight of 113.6 Kilogrammes and the door was arranged to be moved backwards and forwards on a track length of 1.22 meters. Each cycle representing 2.44 meters of rolling engagement for each roller assembly and the cycles per hour were rated at 420. After 30,000 cycles and a period of rest or static load corresponding to 200 hours, the roller assemblies were inspected, and no visible signs of wear of the rollers or the housing parts forming the path for the roller movement was discernible. Accordingly, an extra load was applied to the door, this being 45.5 Kilogrammes, and a further 10,000 cycles were completed with 50 hours of rest under the static load. Again, after inspection, no discernible sign of wear or damage was found, and both roller assemblies were fit for further service. The tests can be put into usage perspective by noting that 40,000 cycles corresponds to 4 openings and closings of a door each day for a period of 27 years. It is also important to note that the tests included static load periods during which local distortion or stresses could arise, but these were not evident because the load is distributed over a plurality of rollers in engagement with the track.

Furthermore, although there are manufacturing and assembly advantages of using short rollers of right-cylindrical configuration, other configurations could be used. For instance, the rollers could be shaped to complement the configuration of the head of the rail; the ends of the rollers could be stepped, or the rollers could be assemblies of sleeves or tubes on a carrier pin.

It will also be appreciated that the roller assembly according to this invention can easily be dismantled or replaced, and servicing like lubrication is not required. Although the housing is preferably made of a low friction material, it could be made of a metal, such as aluminium or zinc alloy, selected to have suitable compatible wear and friction characteristics for use with the rollers.

It is also envisaged that the construction of the carrier could be varied, in particular, to provide an open-sided box-like carrier which encloses the housing assembly, and a simple plate to close the side and hold the assembly together. In such an arrangement the box-like carrier would provide the inclined face(s) and complementary grooves or recesses would be provided in both the open-sided part and the side plate.

What we claim is:

1. A roller assembly for mounting on an element for sliding movement on a rail, said assembly comprising:

a roller housing having two complementary parts, each said part being formed with a respective complementary groove of oval configuration defining an oval continuous path;

a plurality of short rollers of right-cylindrical configuration located in said housing for rolling movement along and around said path with their opposed ends each being located in said respective complementary groove; and an elongate slot in said housing opening to a substantially linear portion of said path whereby a plurality of rolling contact faces being central portions of said short rollers are presented for rolling engagement with said rail in use.

2. A roller assembly according to claim 1 wherein said short rollers are formed of acetal resin and said housing is mounted in a carrier, said housing and said carrier each having respective faces inclined relative to said linear portion of said path, said carrier comprising a metal body having two inclined faces each for guiding and locating complementary formations on said housing, and means on said carrier for acting between said carrier and said housing for adjusting displacement of said respective inclined faces whereby the vertical position of said housing relative to said carrier is varied between two extreme positions of adjustment limited by means of said carrier.

* * * * *